(12) United States Patent
Cormier et al.

(10) Patent No.: US 11,965,863 B2
(45) Date of Patent: Apr. 23, 2024

(54) SAMPLE AUTOMATION MANAGER

(71) Applicant: Waters Technologies Corporation, Milford, MA (US)

(72) Inventors: Sylvain Gilles Cormier, Mendon, MA (US); Joseph D. Antocci, Leominster, MA (US); Francis Patrick Tracey, Jericho, VT (US); Charles H. Phoebe, Jr., Venetia, PA (US)

(73) Assignee: Waters Technologies Corporation, Milford, MA (US)

( * ) Notice: Subject to any disclaimer, the term of this patent is extended or adjusted under 35 U.S.C. 154(b) by 0 days.

(21) Appl. No.: 18/070,859

(22) Filed: Nov. 29, 2022

(65) Prior Publication Data
US 2023/0094740 A1 Mar. 30, 2023

Related U.S. Application Data

(62) Division of application No. 17/209,502, filed on Mar. 23, 2021, now Pat. No. 11,573,211.
(Continued)

(51) Int. Cl.
*G01N 30/24* (2006.01)
*G01N 30/20* (2006.01)
(Continued)

(52) U.S. Cl.
CPC ............ *G01N 30/20* (2013.01); *G01N 30/24* (2013.01); *G01N 30/38* (2013.01); *G01N 2030/027* (2013.01); *G01N 2030/207* (2013.01)

(58) Field of Classification Search
CPC ........ G01N 30/20; G01N 30/24; G01N 30/38; G01N 2030/027; G01N 2030/207;
(Continued)

(56) References Cited

U.S. PATENT DOCUMENTS 5,305,650 A * 4/1994 Koike ................ G01N 1/28
73/864.21
9,810,668 B2 11/2017 Neal
(Continued)

FOREIGN PATENT DOCUMENTS

CN 102576009 A 7/2012
JP 2007107918 A 4/2007
(Continued)

OTHER PUBLICATIONS

International Search Report and Written Opinion in PCT/US2021/023596 dated Aug. 23, 2021.
(Continued)

*Primary Examiner* — Robert R Raevis
(74) *Attorney, Agent, or Firm* — Schmeiser, Olsen & Watts LLP; Victor J. Baranowski

(57) ABSTRACT

A liquid chromatography system includes a solvent delivery system, a sample manager including a sample delivery system in fluidic communication with the solvent delivery system, the sample delivery system configured to inject a sample from a sample-vial into a chromatographic flow stream, a liquid chromatography column located downstream from the sample delivery system, and a detector located downstream from the liquid chromatography column. The sample delivery system further includes a first needle drive including a first sample needle configured to extract the sample from the sample-vial and deliver the sample to the liquid chromatography column, and a first syringe in communication with the first sample needle configured to meter extraction of the sample from the sample-vial. The sample manager further includes a sample
(Continued)

automation system that includes a second needle drive including a second sample needle configured to add a volume of reagent to the sample-vial.

20 Claims, 16 Drawing Sheets

Related U.S. Application Data

(60) Provisional application No. 63/000,856, filed on Mar. 27, 2020.

(51) Int. Cl.
*G01N 30/38* (2006.01)
*G01N 30/02* (2006.01)

(58) Field of Classification Search
CPC .............. G01N 2030/202; G01N 30/04; G01N 2030/067; G01N 30/02
USPC ........... 73/61.52, 61.55, 61.56, 61.59, 64.56, 73/864.21, 863.01, 864.22, 864.81; 422/64, 67, 68.1, 69, 70, 81, 82, 509; 436/164, 43, 54, 174, 179, 180; 210/656, 210/657, 659, 198.2
See application file for complete search history.

(56) References Cited

U.S. PATENT DOCUMENTS

| | | |
|---|---|---|
| 2007/0295113 A1 | 12/2007 | Londo et al. |
| 2014/0116159 A1 | 5/2014 | Zimmerman et al. |
| 2015/0204825 A1* | 7/2015 | Angelescu ............. G01N 30/86 73/61.55 |

FOREIGN PATENT DOCUMENTS

| | | |
|---|---|---|
| WO | 9505590 A1 | 2/1995 |
| WO | 2014200373 A1 | 6/2014 |

OTHER PUBLICATIONS

Restriction Requirement in U.S. Appl. No. 17/209,502 dated Mar. 24, 2021.
Non-Final Office Action in U.S. Appl. No. 17/209,502 dated Jun. 27, 2022.
Notice of Allowance in U.S. Appl. No. 17/209,502 dated Oct. 14, 2022.
International Preliminary Report on Patentability in PCT/US2021/023596 dated Oct. 6, 2022.

* cited by examiner

SAMPLE AUTOMATION MANAGER

RELATED APPLICATION

This application is a division of U.S. patent application Ser. No. 17/209,502 filed Mar. 23, 2021 and titled "Sample Automation manager," which claims the benefit of the earlier filing date of U.S. Provisional Patent Application Ser. No. 63/000,856 filed Mar. 27, 2020 and titled "Sample Automation Manager," the entireties of which are incorporated herein by reference.

FIELD OF THE INVENTION

The invention relates generally to liquid chromatography systems. More particularly, the invention relates to a sample automation manager for a liquid chromatography system, and associated methods.

BACKGROUND

Chromatography is a set of techniques for separating a mixture into its constituents. For instance, in a liquid chromatography system, a pump takes in and delivers a mixture of liquid solvents to a sample manager, where an injected sample awaits its arrival. In an isocratic chromatography system, the composition of the liquid solvents remains unchanged, whereas in a gradient chromatography system, the solvent composition varies over time. The mobile phase, comprised of a sample dissolved in a mixture of solvents, passes to a column, referred to as the stationary phase. By passing the mixture through the column, the various components in the sample separate from each other at different rates and thus elute from the column at different times. A detector receives the elution from the column and produces an output from which the identity and quantity of the analysis may be determined.

Prior to being provided into the liquid chromatography system, the sample may be provided to a sample manager. The sample manager may be configured to prevent the sample from degrading or becoming otherwise damaged while providing the sample into the liquid chromatography system. Sample managers are regularly interacted with by technicians and as such must be user friendly, dependable, accurate, reliable, serviceable, and cost effective. Typical sample managers can accept a vial or tray of vials, draw a sample from a selected position, and inject the sample into a liquid chromatography system.

Improved sample managers, systems and methods, capable of new and improved functionalities would be well received in the art.

SUMMARY

In one embodiment, a liquid chromatography system comprises: a solvent delivery system; a sample manager including a sample delivery system in fluidic communication with the solvent delivery system, the sample delivery system configured to inject a sample from a sample-vial into a chromatographic flow stream; a liquid chromatography column located downstream from the sample delivery system; and a detector located downstream from the liquid chromatography column. The sample delivery system further includes: a first needle drive including a first sample needle configured to extract the sample from the sample-vial and deliver the sample to the liquid chromatography column; and a first syringe in communication with the first sample needle configured to meter extraction of the sample from the sample-vial. The sample manager further includes a sample automation system that includes: a second needle drive including a second sample needle configured to add a volume of reagent to the sample-vial.

Additionally or alternatively, the sample manager further includes: a second syringe in communication with the second needle configured to meter drawn samples and the volume of reagent.

Additionally or alternatively, the sample manager further includes: an RFID scanner configured to identify sample-vials being managed by the sample manager.

Additionally or alternatively, the sample manager further includes: a mixer configured to automatically mix the sample within the sample-vial, wherein the mixer includes a magnetic structure configured to impart movement of a magnet within the sample-vial in order to mix the sample by creating a vortex inside the sample-vial through mechanical contact and rotation.

Additionally or alternatively, the sample manager further includes: a heater system configured to apply heat to the sample-vial.

Additionally or alternatively, the second needle drive is further configured to draw the sample from the sample-vial and dispense the sample into a second sample-vial.

Additionally or alternatively, the sample manager further includes: a sample-vial belt system including a belt drive having a first pulley, a second pulley and a belt, the belt having an outer surface configured to receive a plurality of sample-vials movable with the belt, the belt configured to move the plurality of sample-vials into a first position for the first sample needle to be inserted into one of the plurality of sample-vials, and a second position for the second sample needle to be inserted into one of the plurality of sample-vials.

Additionally or alternatively, the sample manager further includes a control system configured to control at least one of the following operations of the sample manager: adding a specified volume of liquid to a vial; bringing a vial over a mixer and activating a mixer for a predetermined time period; transferring a specified volume from a first vial and dispensing the specified volume into a second vial; heating a vial for a predetermined period; and scanning a vial with an RFID scanner configured to identify the vial to the control system.

In another embodiment, a liquid chromatography sample manager comprises: a sample delivery system configured to inject a sample from a sample-vial into a chromatographic flow stream, wherein the sample delivery system further includes: a first needle drive including a first sample needle configured to extract the sample from the sample-vial and deliver the sample to the liquid chromatography column; and a first syringe in communication with the first sample needle configured to meter extraction of the sample from the sample-vial; and a sample automation system that includes: a second needle drive including a second sample needle configured to add a volume of reagent to the sample-vial.

Additionally or alternatively, the sample manager further comprises a second syringe in communication with the second needle configured to meter drawn samples and the volume of reagent.

Additionally or alternatively, the sample manager further comprises an RFID scanner configured to identify sample-vials being managed by the sample manager.

Additionally or alternatively, the sample manager further comprises a mixer configured to automatically mix the sample within the sample-vial, wherein the mixer includes a magnetic structure configured to impart movement of a magnet within the sample-vial in order to mix the sample by creating a vortex inside the sample-vial through mechanical contact and rotation.

Additionally or alternatively, the sample manager further comprises a heater system configured to apply heat to the sample-vial.

Additionally or alternatively, the second needle drive is further configured to draw the sample from the sample-vial and dispense the sample into a second sample-vial.

Additionally or alternatively, the sample manager further comprises a sample-vial belt system including a belt drive having a first pulley, a second pulley and a belt, the belt having an outer surface configured to receive a plurality of sample-vials movable with the belt, the belt configured to move the plurality of sample-vials into a first position for the first sample needle to be inserted into one of the plurality of sample-vials, and a second position for the second sample needle to be inserted into one of the plurality of sample-vials.

Additionally or alternatively, the sample manager further comprises a control system configured to control at least one of the following operations of the sample manager: adding a specified volume of liquid to a vial; bringing a vial over a mixer and activating a mixer for a predetermined time period; transferring a specified volume from a first vial and dispensing the specified volume into a second vial; heating a vial for a predetermined period; and scanning a vial with an RFID scanner configured to identify the vial to the control system.

In another embodiment, a sample automation system attachable to a sample manager comprises: a needle drive including a sample needle configured to add a volume of reagent to a sample-vial, the sample needle not configured to be in fluidic communication with a liquid chromatography column when the sample automation system is attached to the sample manager.

Additionally or alternatively, the sample automation system further comprises a syringe in communication with the second needle configured to meter drawn samples and the volume of reagent.

Additionally or alternatively, the sample automation system further comprises an RFID scanner configured to identify sample-vials being managed by the sample manager.

Additionally or alternatively, the sample automation system further comprises a mixer configured to automatically mix the sample within the sample-vial, wherein the mixer includes a magnetic structure configured to impart movement of a magnet within the sample-vial in order to mix the sample by creating a vortex inside the sample-vial through mechanical contact and rotation.

Additionally or alternatively, the sample automation system further comprises a heater system configured to apply heat to the sample-vial.

Additionally or alternatively, the second needle drive is further configured to draw the sample from the sample-vial and dispense the sample into a second sample-vial.

Additionally or alternatively, the sample automation system further comprises a sample-vial belt system including a belt drive having a first pulley, a second pulley and a belt, the belt having an outer surface configured to receive a plurality of sample-vials movable with the belt, the belt configured to move the plurality of sample-vials into a first position for the first sample needle to be inserted into one of the plurality of sample-vials, and a second position for the second sample needle to be inserted into one of the plurality of sample-vials.

Additionally or alternatively, the sample automation system further comprises a control system configured to control at least one of the following operations of the sample manager: adding a specified volume of liquid to a vial; bringing a vial over a mixer and activating a mixer for a predetermined time period; transferring a specified volume from a first vial and dispensing the specified volume into a second vial; heating a vial for a predetermined period; and scanning a vial with an RFID scanner configured to identify the vial to the control system.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

As described herein, prior to performing a liquid chromatography run, a technician loads one or more vials containing samples onto a sample-vial carrier located within a thermal chamber of a sample manager system. The sample manager system includes a sample delivery system that is configured to transfer the sample from the sample-vial carrier into a chromatographic flow stream that provides the sample to a liquid chromatography column. The sample manager described herein includes a sample automation system that may include structure and a control system that is configured to perform various functionalities beyond simply transferring the sample into the chromatography flow stream. For example, the sample automation system may be configured to do one or more of the following: 1) add a specified volume of liquid to a sample-vial; 2) bring a vial over a mixer for mixing the vial and sample within; 3) transfer a specified volume of a sample from a first vial into a second vail; 4) heat a sample within a vial; and 5) and scan a vial to identify the vial for chain of custody purposes prior to or during automated procedures on the sample within the vial.

Figure 1:
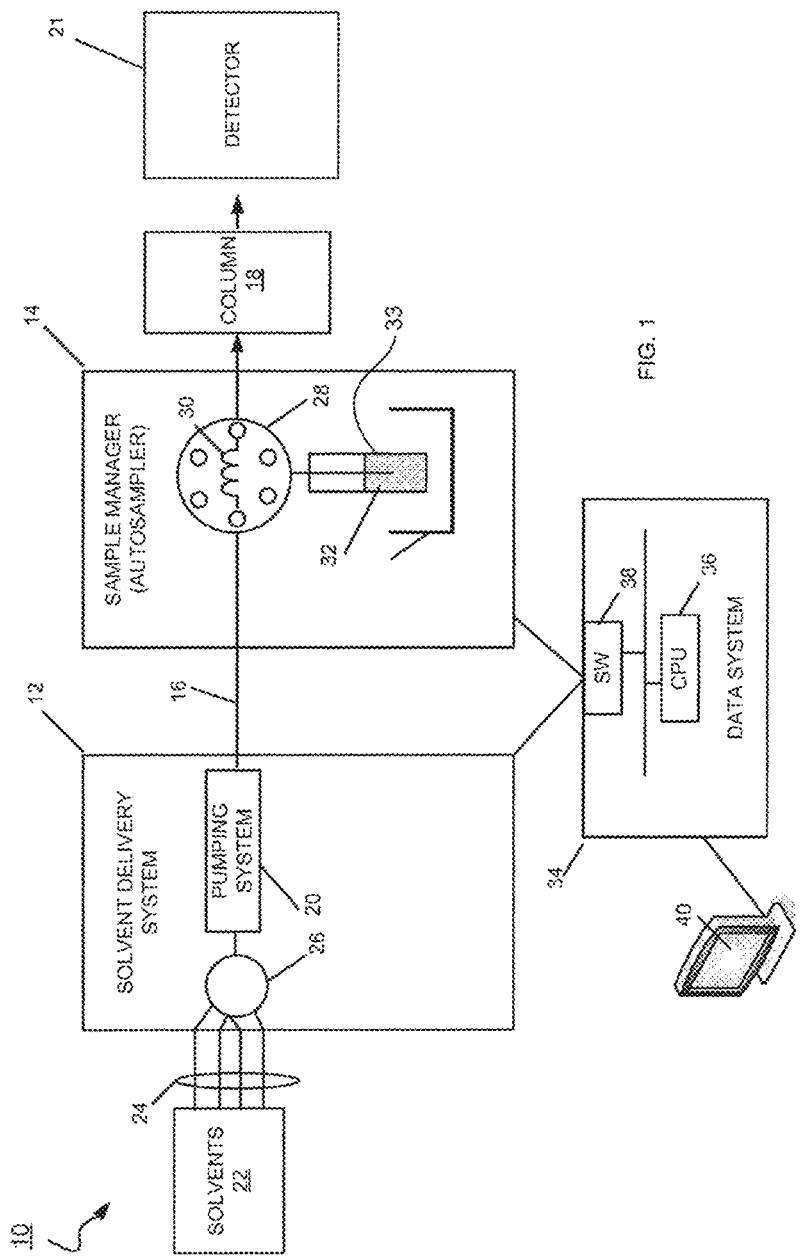
FIG. 1 depicts a schematic view of a liquid chromatography system including a sample manager in accordance with one embodiment.

The features of the sample delivery system and sample manager thermal chamber described herein may be applicable to any liquid chromatography system configured to deliver samples into a chromatographic flow stream. As one example, FIG. 1 shows an embodiment of a liquid chromatography system 10 for separating a mixture into its constituents. The liquid chromatography system 10 includes a solvent delivery system 12 in fluidic communication with a sample manager 14 (also called an injector or an autosampler) through tubing 16. The sample manager 14 is in fluidic communication with a chromatographic column 18. A detector 21 for example, a mass spectrometer, is in fluidic communication with the column 18 to receive the elution.

The solvent delivery system 12 includes a pumping system 20 in fluidic communication with solvent reservoirs 22 from which the pumping system 20 draws solvents (liquid) through tubing 24. In one embodiment, the pumping system 20 is embodied by a low-pressure mixing gradient pumping system having two pumps fluidically connected in series. In the low-pressure gradient pumping system, the mixing of solvents occurs before the pump, and the solvent delivery system 12 has a mixer 26 in fluidic communication with the solvent reservoirs 22 to receive various solvents in metered proportions. This mixing of solvents (mobile phase) composition that varies over time (i.e., the gradient).

The pumping system 20 is in fluidic communication with the mixer 26 to draw a continuous flow of gradient therefrom for delivery to the sample manager 14. Examples of solvent delivery systems that can be used to implement the solvent delivery system 12 include, but are not limited to, the ACQUITY Binary Solvent Manager and the ACQUITY Quaternary Solvent Manager, manufactured by Waters Corp. of Milford, Mass.

The sample manager 14 may include an injector valve 28 having a sample loop 30. In a load state, the sample manager 14 may the position of the injector valve 28 is such that the sample manager 14 loads the sample 32 into the sample loop 30. The sample 32 is drawn from a vial contained by a sample-vial carrier. "Sample-vial carrier" herein means any device configured to carry a sample-vial 33, such as the sample-vial belt described herein below. In an injection state, the position of the injector valve 28 changes so that the sample manager 14 introduces the sample in the sample loop 30 into the continuously flowing mobile phase from the solvent delivery system. The mobile phase thus carries the sample into the column 18. In other embodiments, a flow through needle (FTN) may be utilized instead of a Fixed-Loop sample manager. Using an FTN approach, the sample may be pulled into the needle and then the needle may be moved into a seal. The valve may then be switched to make the needle in-line with the solvent delivery system.

The liquid chromatography system 10 further includes a data system 34 that is in signal communication with the solvent delivery system 12 and the sample manager 14. The data system 34 has a processor 36 and a switch 38 (e.g. an Ethernet switch) for handling signal communication between the solvent delivery system 12 and sample manager 14, as described herein. Signal communication among the various systems and instruments can be electrical or optical, using wireless or wired transmission. A host computing system 40 is in communication with the data system 34 by which a technician can download various parameters and profiles (e.g., an intake velocity profile) to the data system 34.

Figure 2:
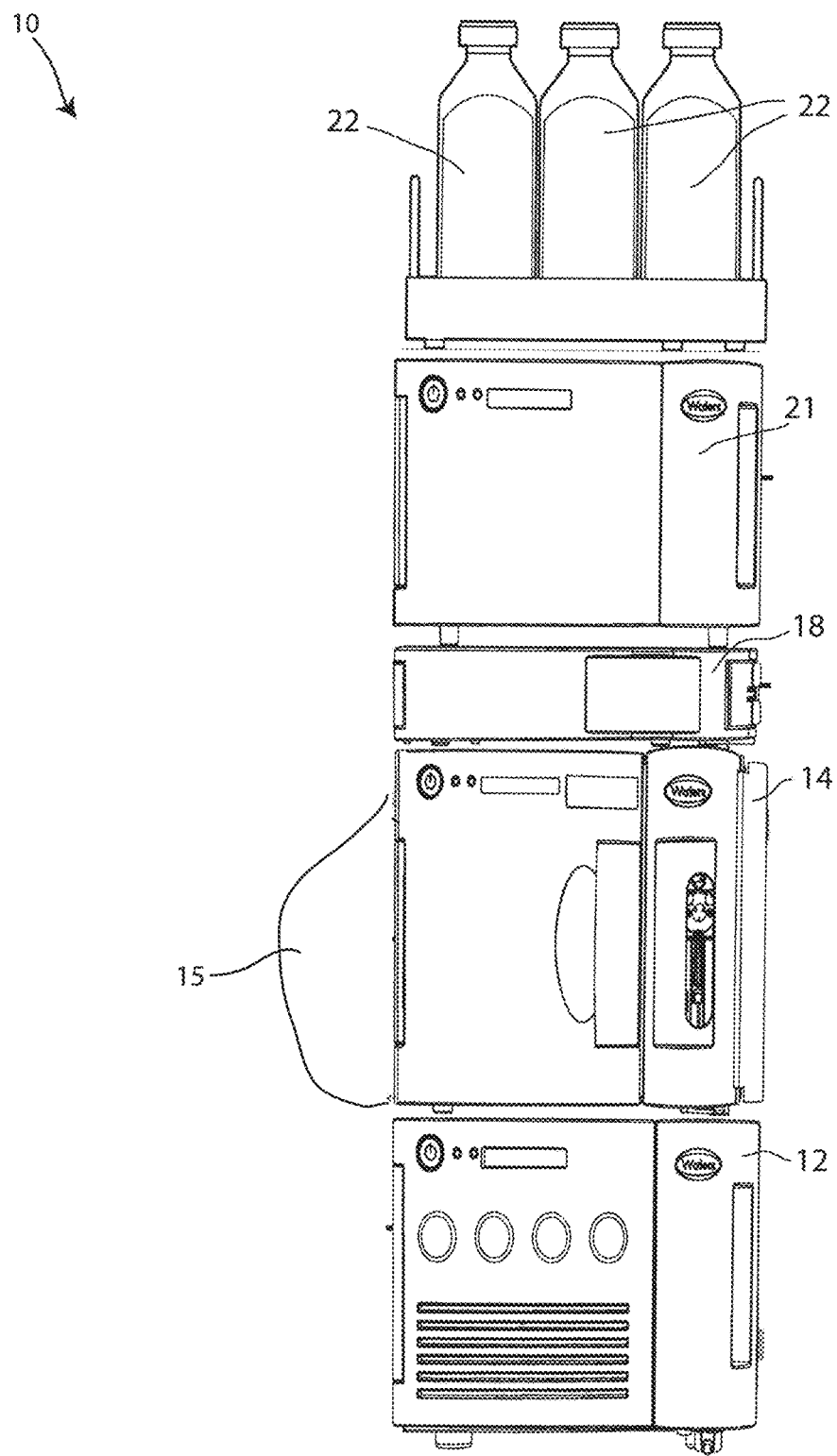
FIG. 2 depicts a perspective view of a liquid chromatography system including the sample manager of FIG. 1 having a sample automation system in accordance with one embodiment.

FIG. 2 shows a perspective view of the liquid chromatography system 10 including the sample manager 14 having an attached sample automation system 15, the detector 21, the chromatographic column 18, the solvent delivery system 12, and the solvents 22. Each of the sample manager 14, the sample automation system 15, the detector 21, the chromatographic column 18, the solvent delivery system 12 may include a housing or body within which the various features may be housed, such as the data system 34, the sample loop 30 and injector valve 28, the pumping system 20, the mixer 26 and the tubing 24. The various components 12, 14, 18, 19, 21, 22 may be interconnected with fluidic tubes and in signal communication to the data system 34 of the liquid chromatography system 10. The liquid chromatography system 10 is shown with the solvent delivery system 12, sample manager 14, chromatographic column 18, detector 21 and a tray for holding the solvents 22 stacked together where the sample automation system 15 is attached to a side of the sample manager 14.

Figure 3:
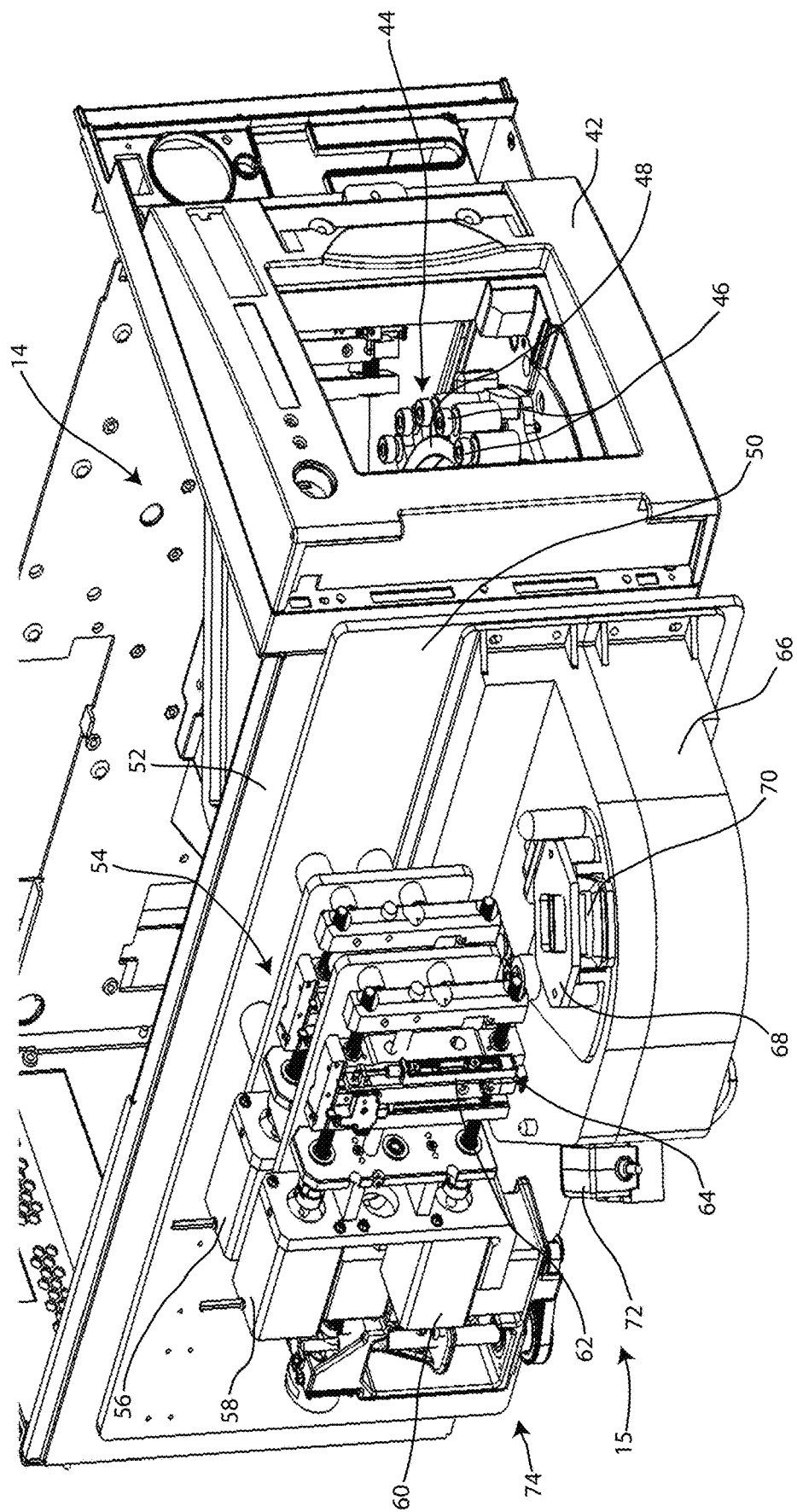
FIG. 3 depicts a perspective view of the sample manager of FIGS. 1 and 2 having the sample automation system with portions of housing removed to show internal components, in accordance with one embodiment.

FIG. 3 depicts a perspective view of the sample manager 14 of FIGS. 1 and 2 having the sample automation system 15 with portions of outer housing removed to show internal components, in accordance with one embodiment. The sample manager 14 includes a front door 42 and a thermal chamber 44 within which the sample manager system 14 includes the sample delivery system configured to transfer samples from sample-vials 46 into a chromatographic flow stream that provides the sample downstream to the liquid chromatography column 18 (not shown in FIG. 3). The sample-vials 46 may be located on a sample-vial carrier system 48 configured to move the sample-vials 46 within the thermal chamber 44 and within the sample automation system 15.

As shown, the sample automation system 15 with an outer housing removed. The sample automation system 15 includes a frame 50 attached to a side housing 52 of the sample manager 14. The sample automation system 15 further includes a needle drive 54 attached to the frame 50. The needle drive 54 is shown having three separate motors 56, 58, 60 for imparting vertical and/or horizontal motion on one or both of the sample needle and/or the puncture needle. The needle drive 54 further includes one or more needle drive axis 62 configured to hold and/or move the sample needle and/or puncture needle. The needle drive 54 further includes a stripper foot 64 configured to facilitate holding down a sample-vial 46 when the puncture needle retracts from puncturing a sealing membrane of the sample-vial 46.

The sample automation system 15 further includes an outer frame 66 holding the sample-vial carrier system 48. The outer frame 66 includes an insertion door 68 configured to load and unload sample-vials 46 into and out of the sample-vial carrier system 48. Attached above the insertion door 68 is an RFID scanner 70 configured to scan an RFID chip located in or on one or more of the sample-vials 46 within the sample manager 14 and/or sample automation system 15. The RFID scanner 70 may be in communication with the data system 34 such that the sample manager 14 stores a tag number associated with each scanned sample-vial. The data system 34 may maintain sample-vial RFID information in order to maintain a chain of custody on the samples within each sample-vial, associated with the testing conducted by the liquid chromatography system 10.

The sample automation system 15 further includes a syringe system 74 in fluidic communication with the sample needle drive 54. The syringe system 74 will be described in more detail herein below and is shown more clearly in FIG. 6. Still further, the sample automation system 15 further includes a barcode reader 72. The barcode reader 72 may serve as a similar role to the RFID scanner 70 but may read a barcode affixed to the side of the sample-vials 46, in the event that barcodes are utilized instead of RFID chips.

Figure 4:
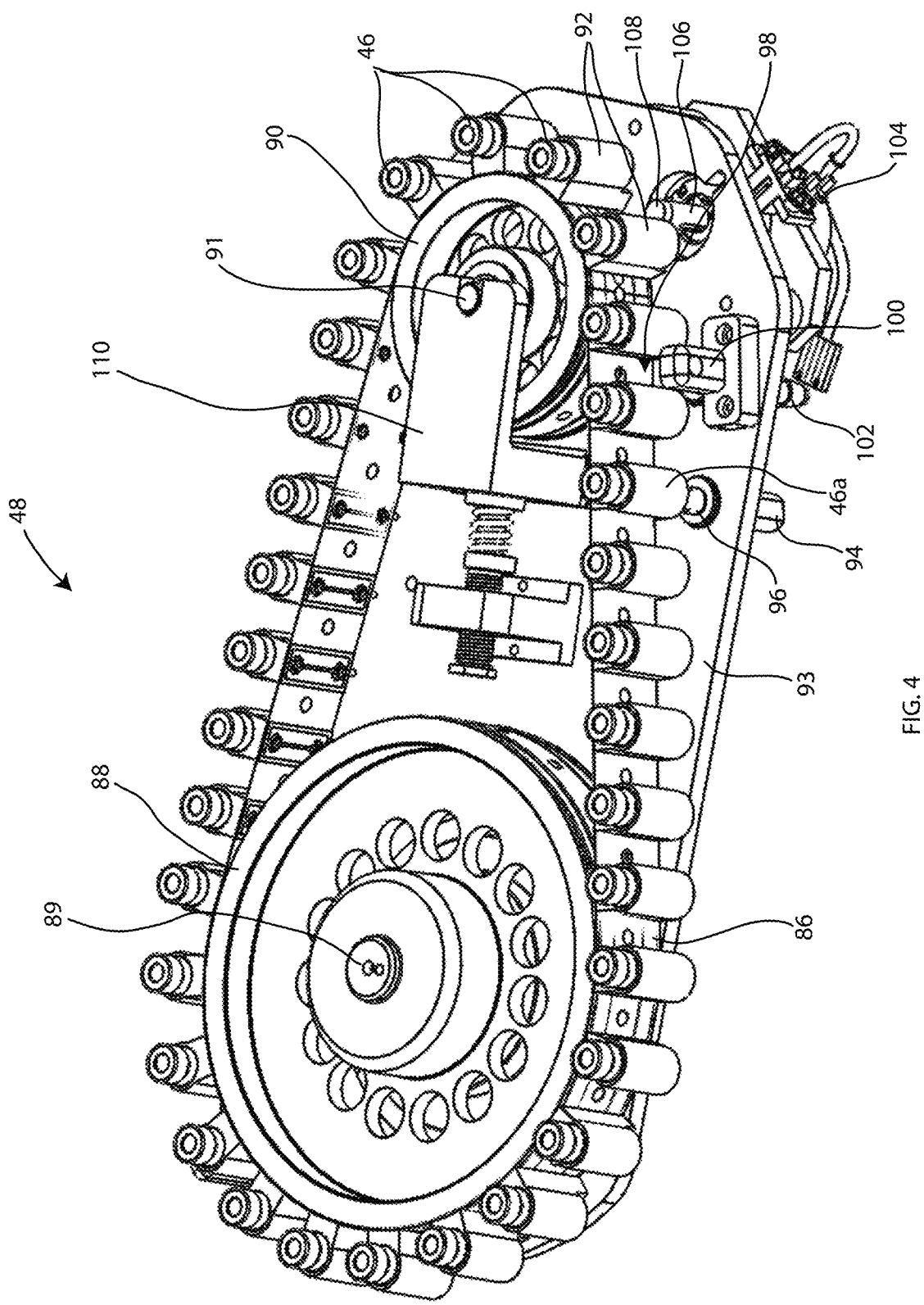
FIG. 4 depicts a perspective view of a sample-vial carrier system of the sample manager of FIGS. 1 and 2, in accordance with one embodiment.

FIG. 4 depicts a perspective view of a sample-vial carrier system 48 of the sample manager 14 of FIGS. 1 and 2, in accordance with one embodiment. The sample-vial transport system 48 includes a belt 86, a first pulley 88 configured to rotate about a first axis 89, and a second pulley 90 configured to rotate about a second axis 91. Attached to the belt 86 are a plurality of sample-vial holders 92 each having one sample-vial 46 contained therein. The belt 86 may be configured to rotate about the radii of each of the first and second pulleys 88, 90 and move the sample-vials 46 into and out of position to be interacted by the needle drive 54 of the sample automation system 15, and a needle drive within the thermal chamber 44 of the sample manager 14. The belt 86 may further be configured to move the sample-vials 46 into and out of position to be interacted with the introduction port, mixing station and heater areas, as described hereinbelow. The belt 86 and pulleys 88, 90 are mounted to a carrier frame 93.

The sample-vial carrier system 48 further includes a sample mixing motor 94 and sample mixing magnet 96 located on a tip of the shaft extending from the sample mixing motor 94. In operation, the sample mixing motor 94 may be configured to rotate a shaft, which in turn rotates the sample mixing magnet 94. The sample mixing magnet, in turn, rotates a magnet located in the proximate sample-vial 46a, which may be configured to mix the sample within the sample-vial 46a. The other sample-vials 46 located on the belt 86 may also include magnets disposed therein which are configured to be moved by the sample mixing magnet 96 during a mixing procedure of the sample automation system 15.

The sample-vial carrier system 48 further includes a sample preparation station 98. The sample preparation station 98 may be located within the outer frame 66 of the sample automation system 15 at a location that is directly below the sample needle of the sample needle drive 54. Thus, the sample needle and puncture needle of the sample needle drive 54 may be configured to interact with a sample vial located at the sample preparation station 98. Located at the sample preparation station 98 may be a stationary magnet 100. The station magnet 100 may be configured to attract a magnet located within the sample-vial 46 when the sample-vial 46 is located at the sample preparation station 98. This may thereby ensure a magnet internal to the sample-vial 46 is moved out of the way of the sample needle during needle injection. The sample preparation station 98 further includes a drain 102 at the same location. When the sample-vial 46 is rotated away from the sample preparation station 98, the sample needle thereby is provided access to the drain 102.

Located below the RFID scanner 70 and the insertion door 68 may be a vial spinner 104 including a motor configured to rotate a shaft 106. A plunger with a soft rubber tip 108 is configured to contact a bottom of the sample-vial 46 located over the shaft 106. The shaft 106 may be configured to move vertically upward to contact the sample-vial 46 once the sample-vial 46 is in position over the vial spinner 104. The vial spinner 104 may be configured to perform this spinning operation on the sample-vial 46 as a way of heating the sample therein, as a way of mixing the sample, or for the purposes of rotating the sample-vial 46 so that the RFID chip is in proper position. In other embodiments, the RFID scanner 70 may be replaced by a barcode reader, and the sample vial may include a barcode label instead of an RFID chip. In this embodiment, the vial spinner 104 may work in conjunction with the barcode reader to spin the sample-vial in a manner that moves an attached barcode in view of a barcode reader.

The sample-vial carrier system 48 further includes the carrier frame 93 upon which is mounted a pulley support system 110. The pulley support system 110 may be used to align the pulley 90 and to adjust the tension in the belt 86.

Figure 5:
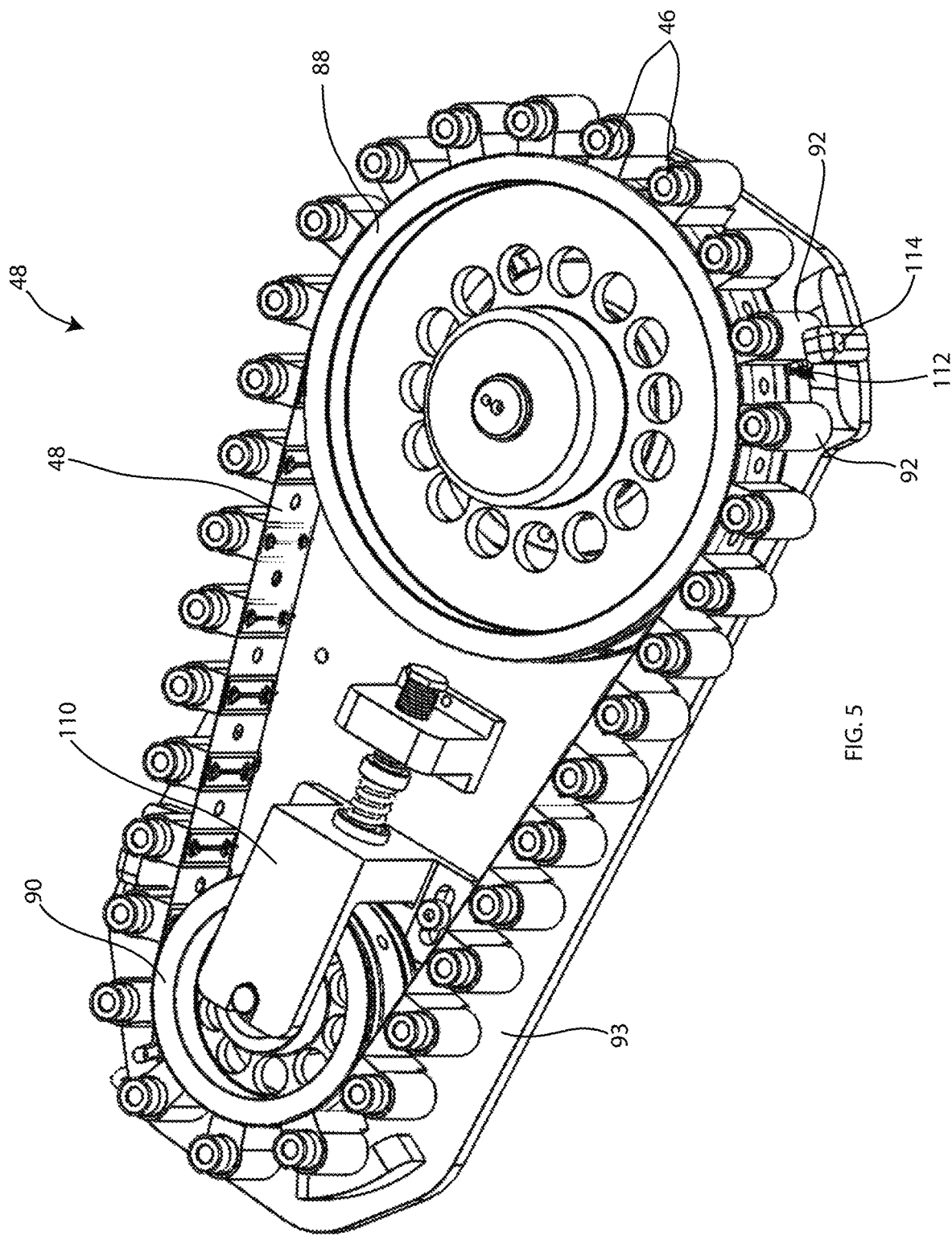
FIG. 5 depicts another perspective view of the sample-vial carrier system of FIG. 4, in accordance with one embodiment.

FIG. 5 depicts another perspective view of the sample-vial carrier system 48 of FIG. 4, in accordance with one embodiment. The sample-vial carrier system 48 further includes a sample injection station 112. The sample injection station 112 may be located within the sample chamber 44 of the sample manager 14 at a location that is directly below the injection sample needle of the sample manager 14 that is in fluidic communication with the downstream column 18 and detector 21. Thus, the sample needle and puncture needle of a sample needle drive internal to the sample chamber 44 of the sample manager 14 may be configured to interact with a sample vial located at the sample injection station 112. Located at the sample injection station 112 may be another station magnet 114. The station magnet 114 may be configured to attract a magnet located within the sample-vial 46 when the sample-vial 46 is located at the sample injection station 112. This may thereby ensure a magnet internal to the sample-vial 46 is moved out of the way of the sample needle during needle injection.

The various components of the sample-vial carrier system 48 may be considered components of the sample manager 14 and/or the sample automation system 15. For example, in one example, the sample automation system 15 may be an add-on feature for modifying an existing sample manager 14. In this example, the sample-vial transport system 48 may replace a rotating sample platter. The sample vial transport system 48, the needle drive 54, the syringe system 74, the outer frame 66 and the various components thereof, may be included in a kit configured to modify an existing sample manager 14.

Figure 6:
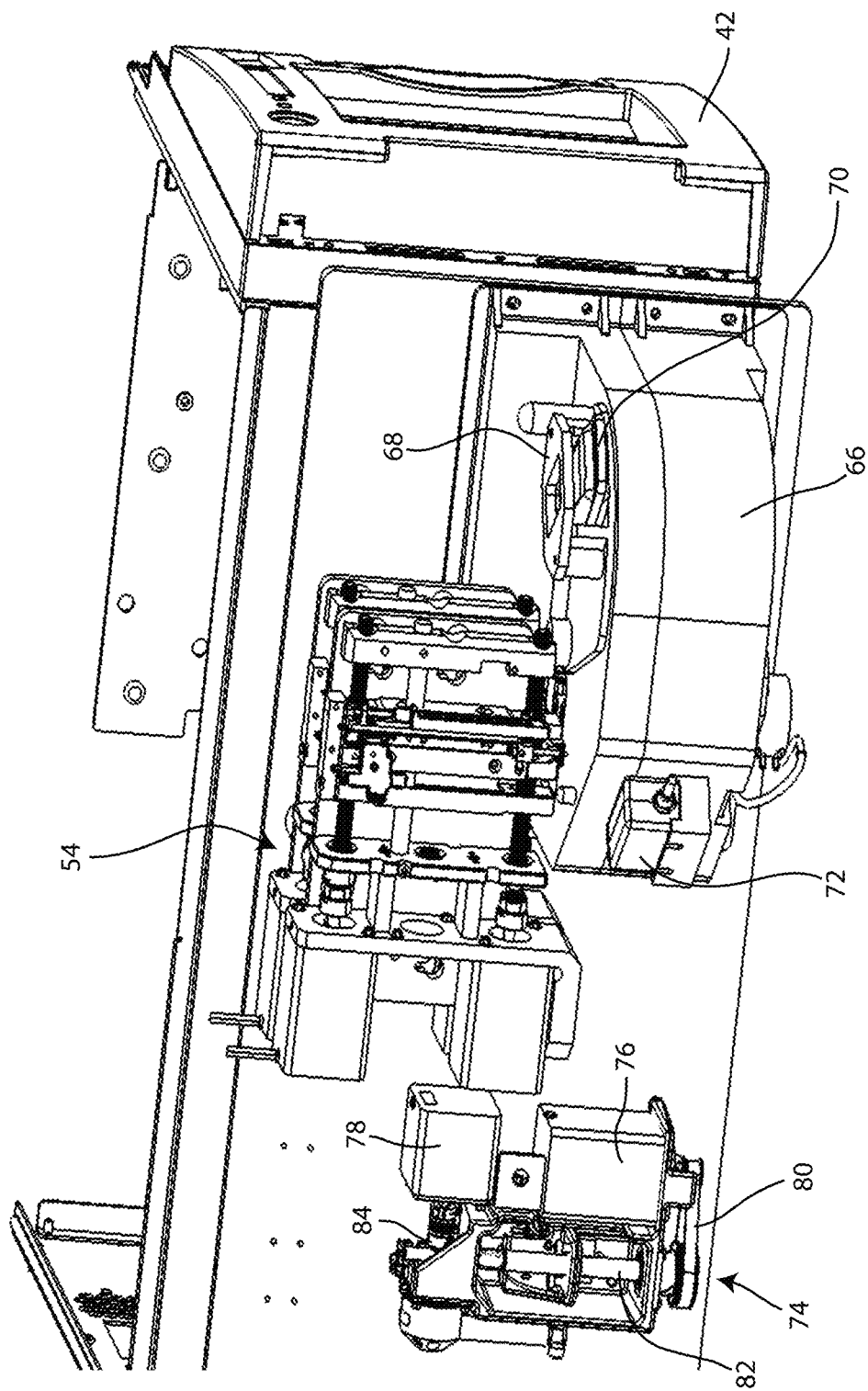
FIG. 6 depicts a perspective view of the sample automation system shown in FIG. 3, in accordance with one embodiment.

FIG. 6 depicts a perspective view of the sample automation system 15 shown in FIG. 3, in accordance with one embodiment. As shown, the sample automation system 15 includes the syringe system 74. The syringe system 74 may include a first motor 76 and a second motor 78. The vertical motor 76 may be configured to operate a belt and pulley system 80 for providing rotational motion to a vertical metering axle 82. The horizontal motor 78 may be configured to operate a horizontal metering axle for 84. The vertical metering axle 82 may be configured to control metering of samples drawn from the sample-vials 46 within the sample automation system 15. The horizontal metering axle 84 may be configured to control metering of external reagents provided to the metering syringe from a reagent source, and then provided from the metering syringe to a sample-vial 46 in an "add reagent" procedure. The second motor 78 may be configured to control a valve connected to the motor, which allows a selection of a vial or an external reagent reservoir. The first motor 76 controls the metering axis, drawing from or injecting to the source thus selected. For example, the second motor 78 can be set to select the vial, and a sample drawn, then another vial can be rotated in and the sample injected allowing vial-to-vial mixing. Alternatively, the second motor 78 may be set to select reagent, and a slug of liquid can be drawn. By altering second motor 78 to select vial, the slug can then be injected into a vial, allowing in-vial dilution.

Figure 7:
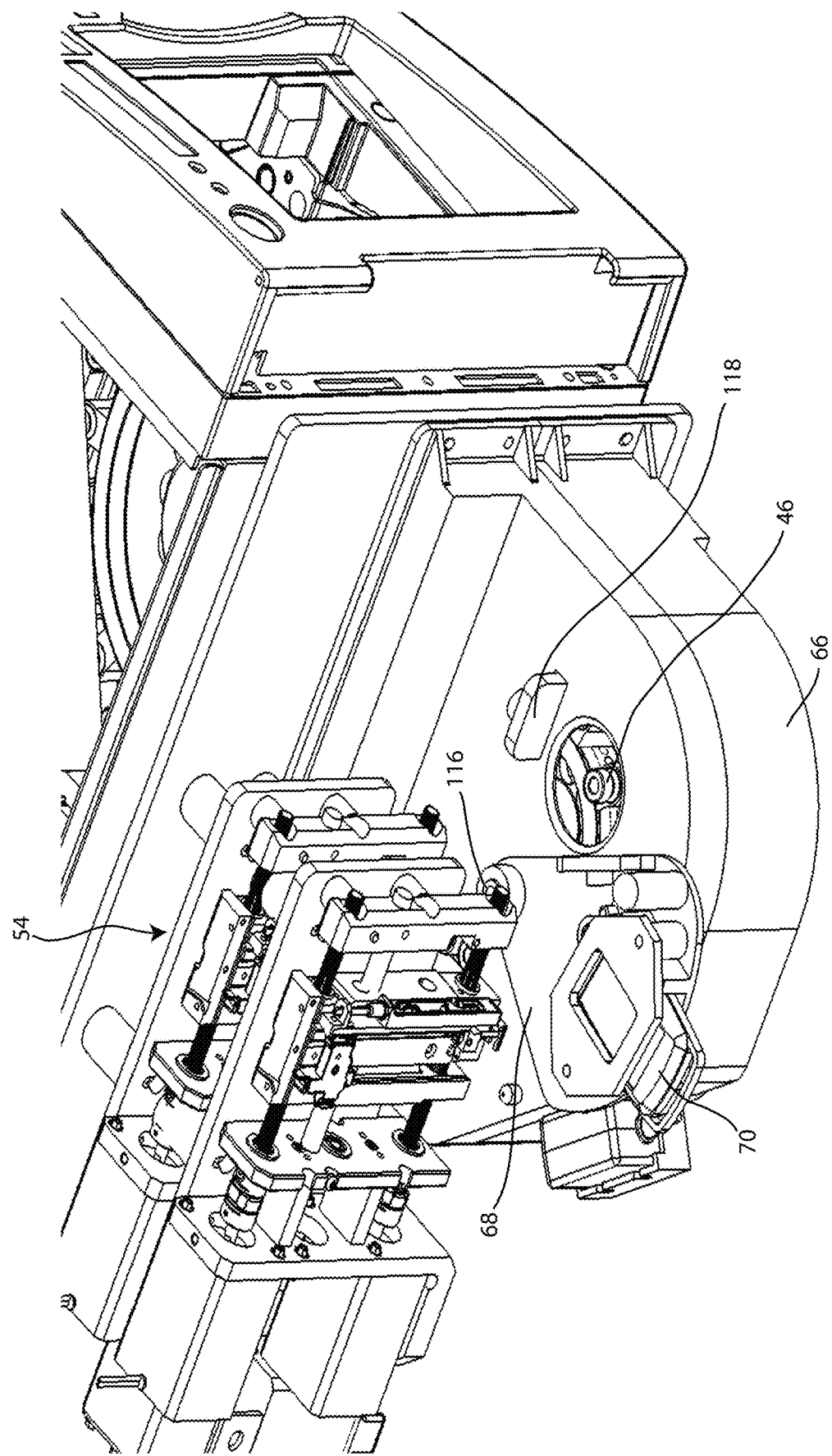
FIG. 7 depicts a perspective view of the sample automation system shown in FIG. 3, with an insertion door open, in accordance with one embodiment.

FIG. 7 depicts a perspective view of the sample automation system shown in FIG. 3, with the insertion door 68 open, in accordance with one embodiment. As shown, the insertion door 68 is configured to open by rotating around a hinge 116. The insertion door 68 is shown closed in FIGS. 3 and 6. In the closed state, the insertion door 68 abuts a stop 118. In an open state, the insertion door 68 reveals access to allow a technician to load a sample vial 46 into one of the sample-vial holders 92.

Figure 8:
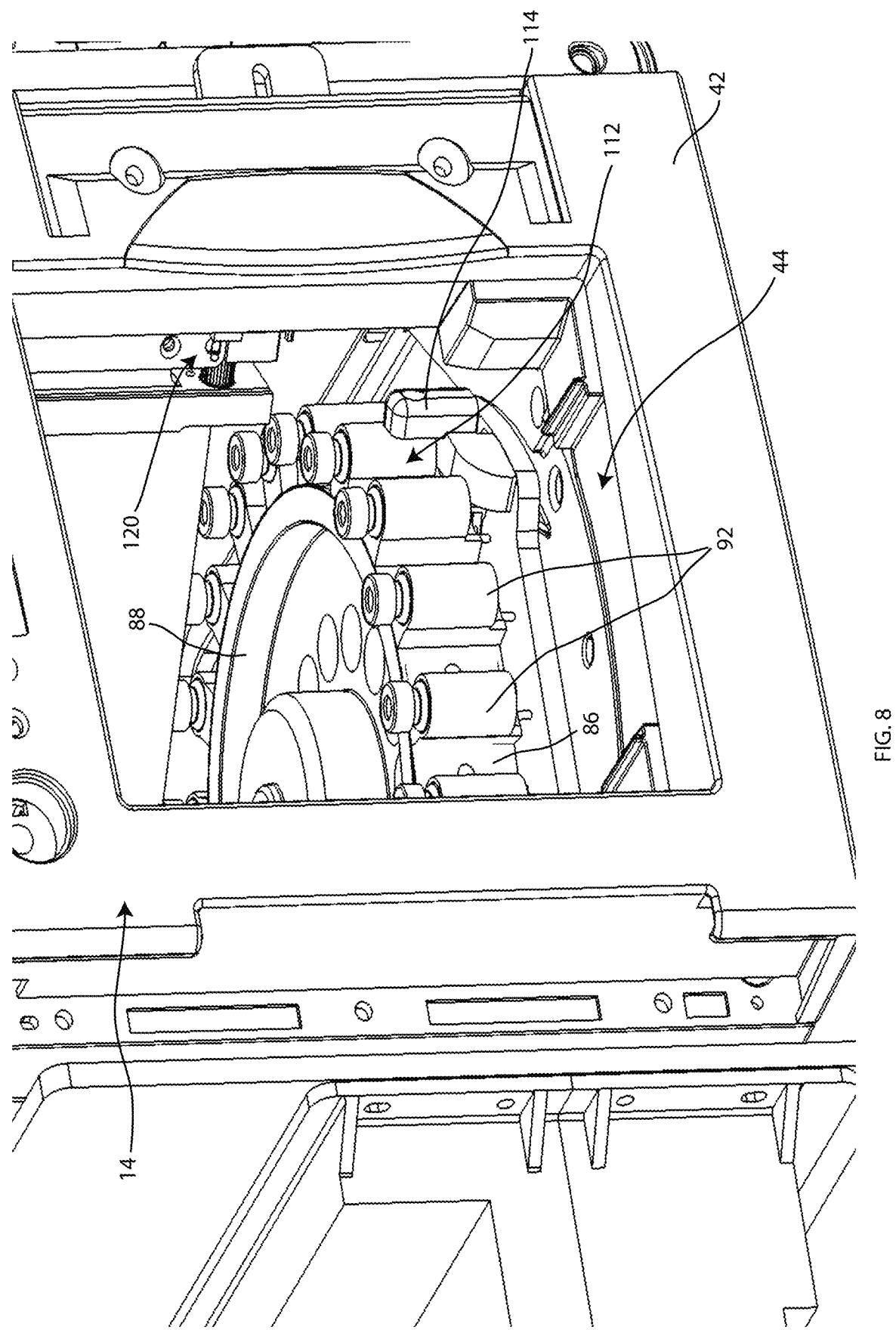
FIG. 8 depicts a perspective view of the sample manager of FIGS. 1 and 2, in accordance with one embodiment.

FIG. 8 depicts a perspective view of the internal chamber 44 of the sample manager 14 through the front door 42, in accordance with one embodiment. The internal chamber 44 includes the pulley 88 and the belt 86 having sample-vials 46 located within sample-vial holders 92. The internal chamber 44 further includes a chamber needle drive 120 movable within the internal chamber 44 and configured to position a sample needle and/or puncture needle over a sample-vial 46 at the sample injection station 112. As shown, the station magnet 114 may be configured to attract a magnet located within the sample-vial 46 when the sample-vial 46 is located at the sample injection station 112. This may thereby ensure a magnet internal to the sample-vial 46 is moved out of the way of the sample needle during needle injection.

Figure 9:
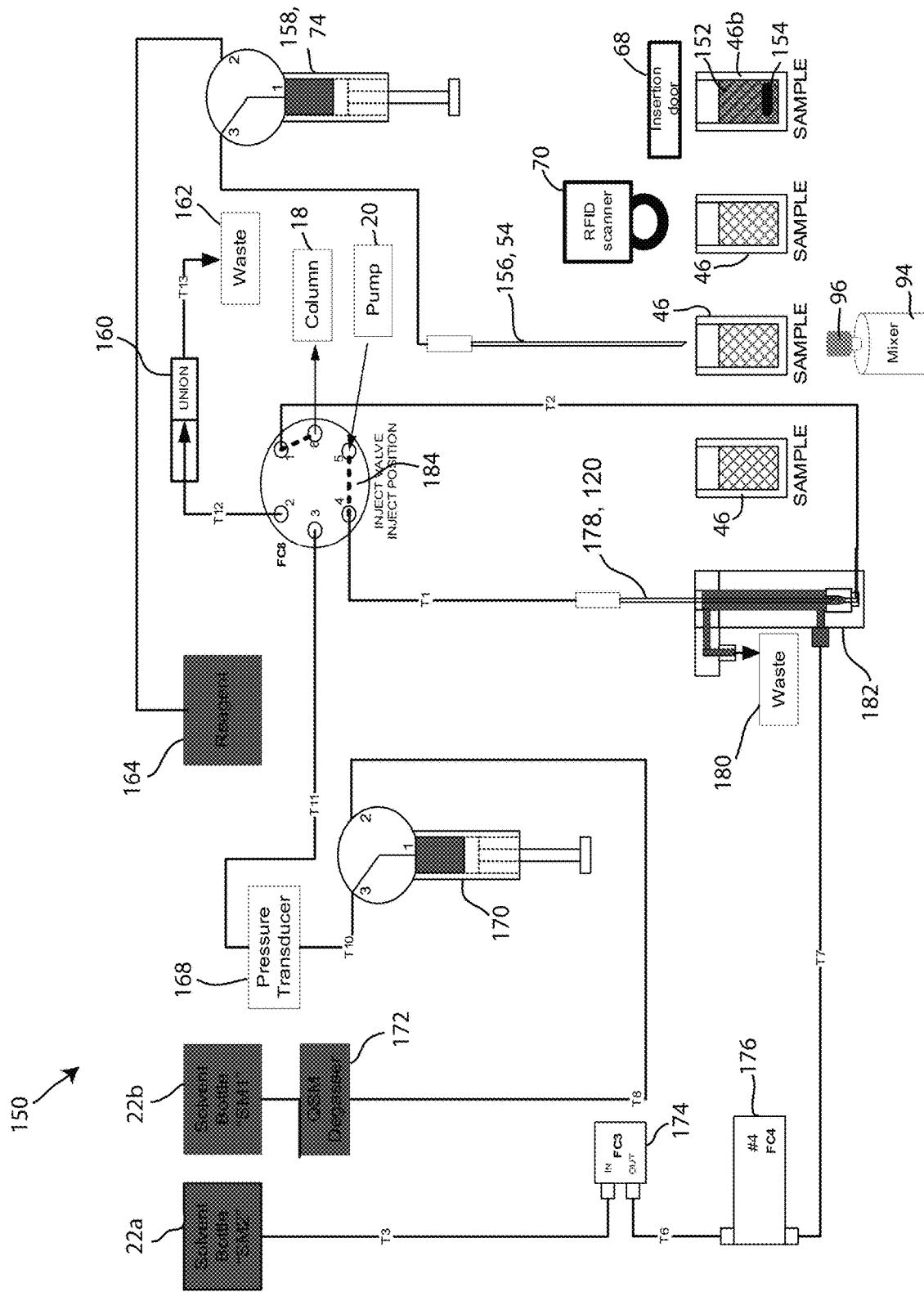
FIG. 9 depicts a schematic view of an insert step of a fluidic system of the sample manager of FIGS. 1-3, in accordance with one embodiment.

FIG. 9 depicts a fluidic system 150 of the sample manager 14 and/or sample automation system 15, in accordance with one embodiment. The fluidic system 150 includes the various components of the liquid chromatography system 10, the sample manager 14 and/or sample automation system 15, shown schematically. For example, shown in the fluidic system 150 is a first solvent bottle 22a, a second solvent bottle 22b, the chromatography column 20, the pump 18, the insertion door 68, the RFID scanner 70, the sample-vials 46, the syringe system 74, the needle drive 54, the chamber needle drive 120, the sample mixing motor 94 and sample mixing magnet 96. Further, one of the sample-vials 46b is shown with a sample 152 and a magnet 154 within the sample-vial 46b. The fluidic system 150 includes various fluidic tubes T1, T2, T3, T4, T5, T6, T7, T8, T9, T10, T11, T12, T13 connecting various components of the system. These fluidic tubes may be any type of fluidic tube fluidically connecting the components of the fluidic system 150. The fluidic system 150 may include any number of fluidic tubes necessary for connecting the components thereof.

The fluidic system includes the solvent bottle 22b in fluidically connected to a degasser 172. The degasser 172 and solvent bottle 22b are fluidically connected with a sample metering syringe 170 which is then fluidically connected to a pressure transducer 168. The pressure transducer 168 is then connected to an inject valve 184, currently shown in an inject position. In this inject position, the chromatography column 18 is fluidically coupled to an injection port 182. The injection port 182 includes a pathway to waste 180, and the pathway to the chromatography column 18. A needle 174 of the chamber needle drive 120 is shown fluidically connected to the injection port 182. The pump 20 is shown connected to the needle 174 of the chamber needle drive 120 via the inject valve 184. In fluidic connection with the injection port 182 is a wash pump 174 connected to another solvent bottle 22a. A solenoid valve 176 is located between the solvent wash pump 174 and the injection port 182. Further, the fluidic system 150 is shown including a reagent reservoir 164 fluidically coupled to the syringe system 74 including a syringe 158. The syringe system 74 is shown fluidically coupled to the needle drive 54 and a sample needle 156 thereof.

FIG. 9 depicts an insert step of a fluidic system 150 of the sample manager 14 and/or sample automation system 15, in accordance with one embodiment. As depicted schematically, the sample-vial 46b is shown after having been inserted into the system through the insertion door 68. As described hereinabove, the sample-vial 46b includes a magnet 154 disposed therein for mixing operations.

Figure 10:
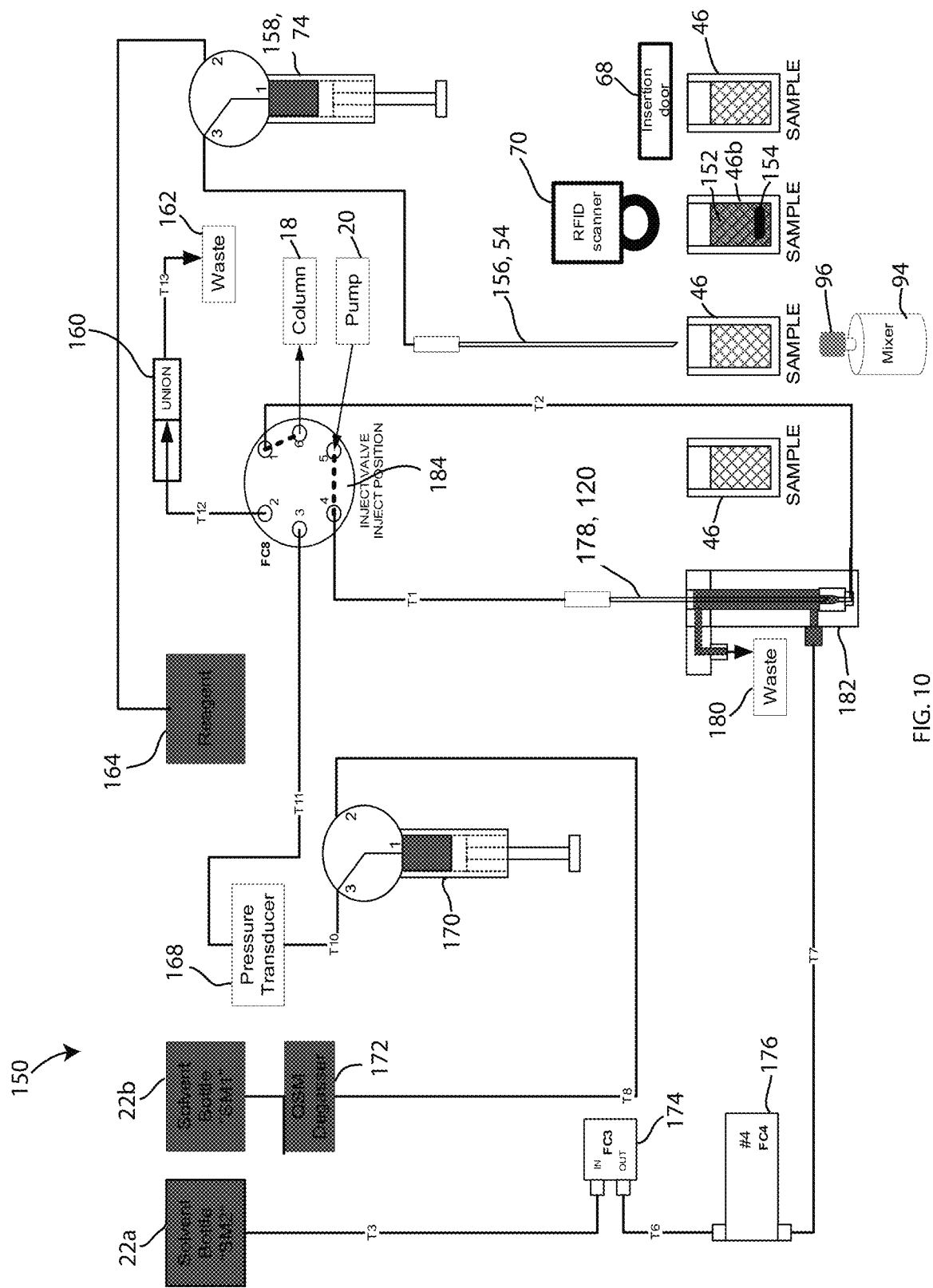
FIG. 10 depicts a schematic view of a read RFID step of the fluidic system of FIG. 9, in accordance with one embodiment.

FIG. 10 depicts a schematic view of a read RFID step of the fluidic system 150 of FIG. 9, in accordance with one embodiment. At this step, the sample-vial 46b has been moved into position, for example, by the sample-vial carrier system 48, below the RFID scanner 70. Here, the RFID scanner 70 is configured to identify the sample-vial 46b by an RFID chip located in the sample-vial 46, for example in a cap of the sample-vial 46.

Figure 11:
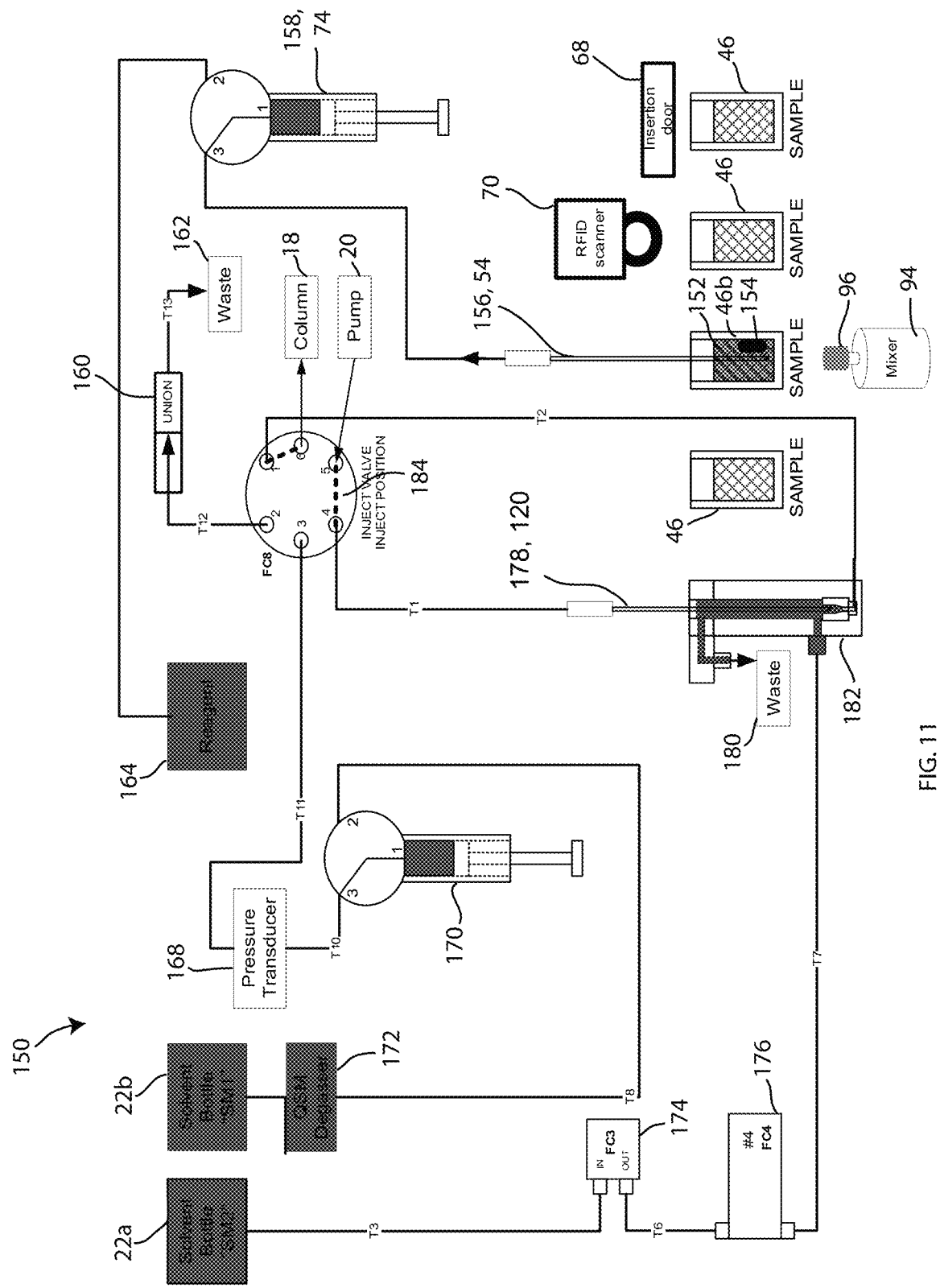
FIG. 11 depicts a schematic view of a draw from a vial step of the fluidic system of FIGS. 9 and 10, in accordance with one embodiment.

FIG. 11 depicts a schematic view of a draw from a vial step of the fluidic system 150 of FIGS. 9 and 10, in accordance with one embodiment. In the draw vial step shown, the needle 156 of the needle drive 54 of the sample automation system 15 is inserted into the sample-vial 46b to draw the sample 152 therefrom with the metering syringe 158. At this sample drawing step, the magnet 154 internal to the sample-vial 46b has been moved to a sidewall within the sample-vial 46b by the station magnet 100 (not shown in FIG. 11; shown in FIG. 4). While not shown, the draw from vial step may be followed by adding the drawn sample to another sample-vial 46 different from the sample vial 46b from which the sample was originally drawn.

Figure 12:
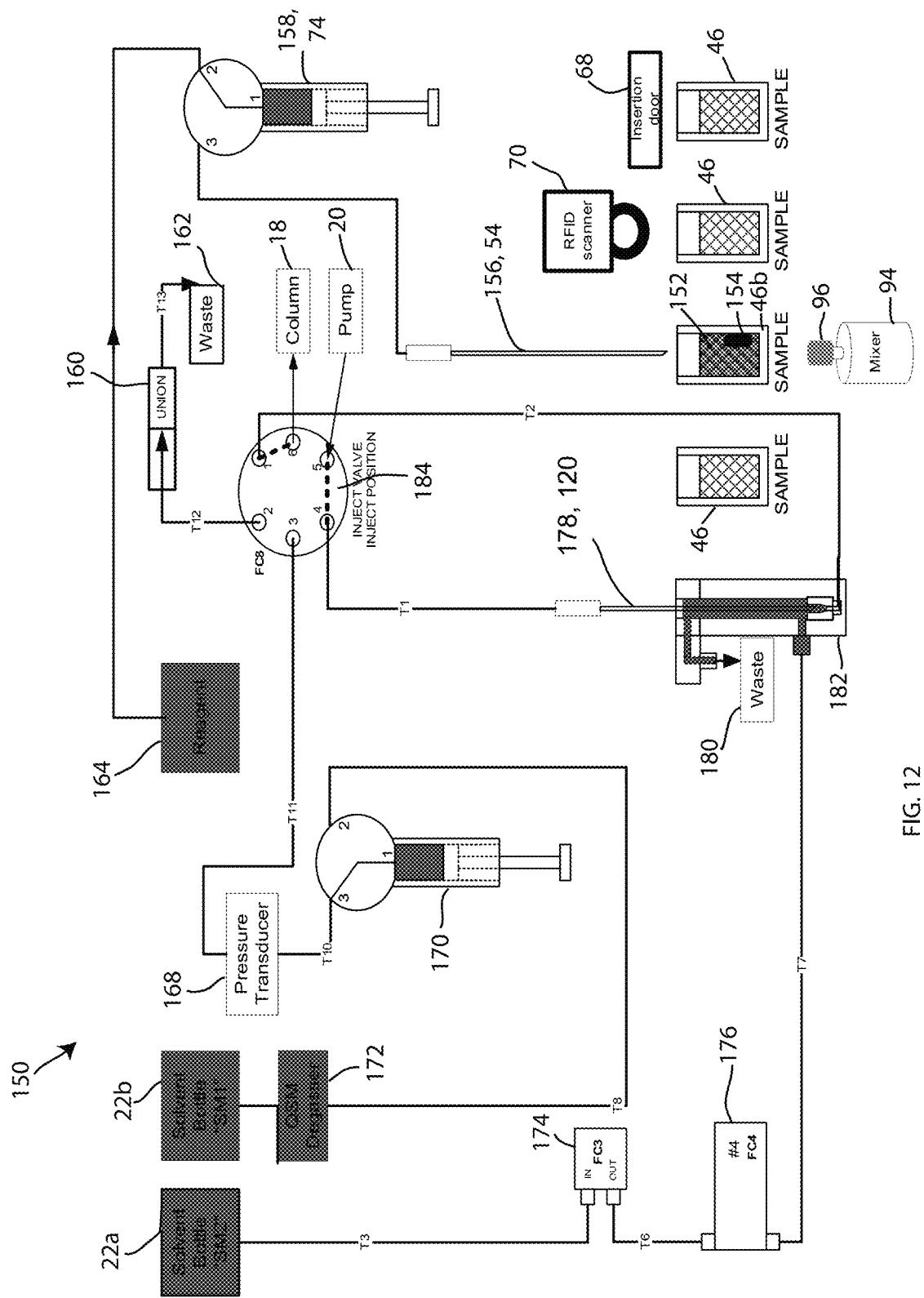
FIG. 12 depicts a schematic view of a draw reagent step of the fluidic system of FIGS. 9-11, in accordance with one embodiment.
Figure 13:
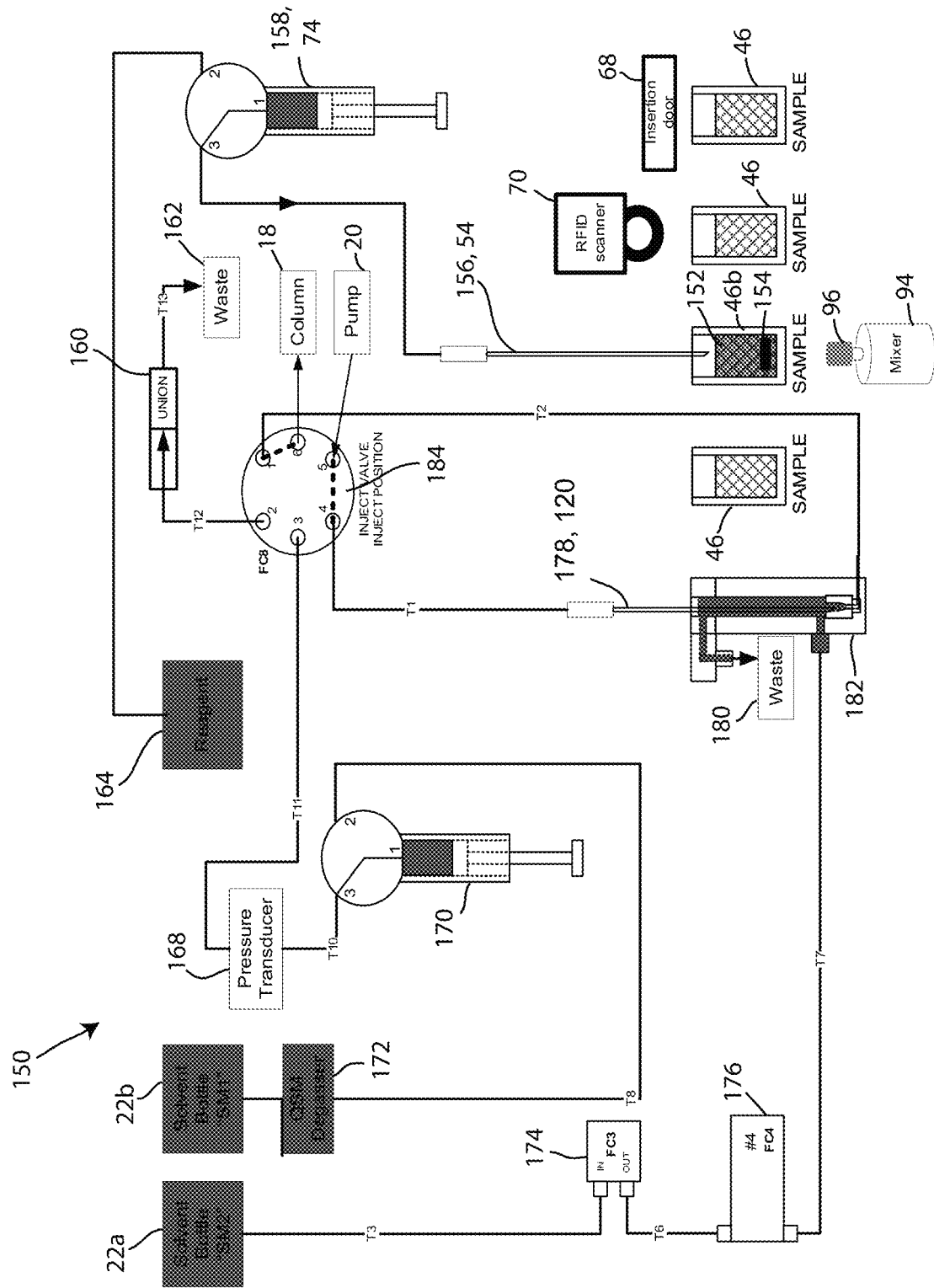
FIG. 13 depicts a schematic view of an add step of the fluidic system of FIGS. 9-12, in accordance with one embodiment.
Figure 14:
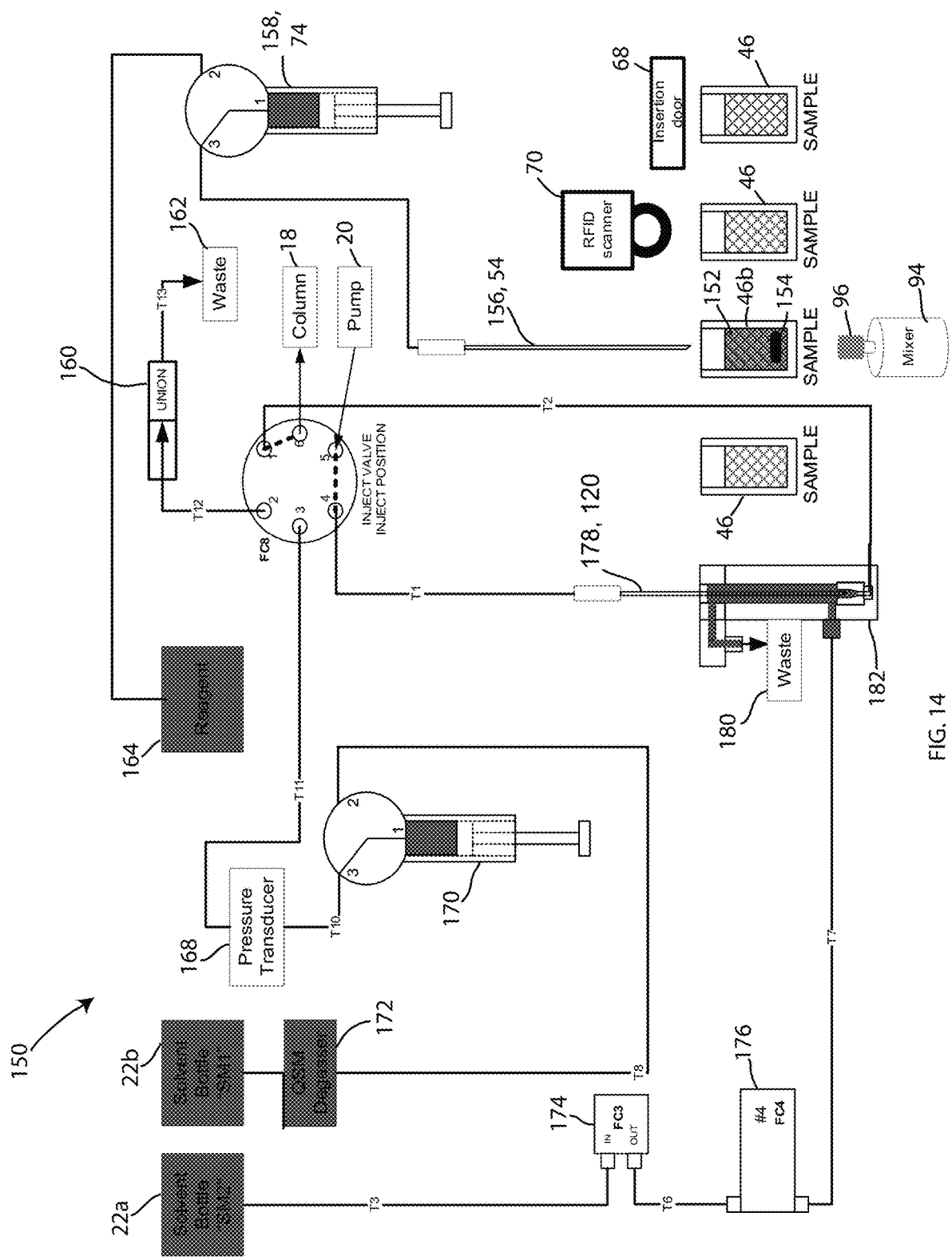
FIG. 14 depicts a schematic view of a mix step of the fluidic system of FIGS. 9-13, in accordance with one embodiment.

FIG. 12 depicts a schematic view of a draw reagent step of the fluidic system 150 of FIGS. 9-11, in accordance with one embodiment. In the draw reagent step, the metering syringe 158 of the syringe system 74 is configured to draw reagent from the reagent reservoir 164. FIG. 13 depicts a schematic view of an add reagent step of the fluidic system 150 of FIGS. 9-12, in accordance with one embodiment. This step may occur after the draw reagent step of FIG. 12. During the add reagent step, the metering syringe valve 74 is switched from a second position to a third position and the metering syringe valve 74 expels the reagent drawn in the draw reagent step. The expelled reagent is expelled through the needle 54 into the sample-vial 46. FIG. 14 depicts a schematic view of a mix step of the fluidic system 150 of FIGS. 9-13, in accordance with one embodiment. During the mix step, the reagent may be mixed with the sample. First, the needle 156 withdraws from the sample-vial 46. Then, the sample mixing motor 94 and sample mixing magnet 96 impart movement of the internal magnet 154 within the sample-vial 46b.

Figure 15:
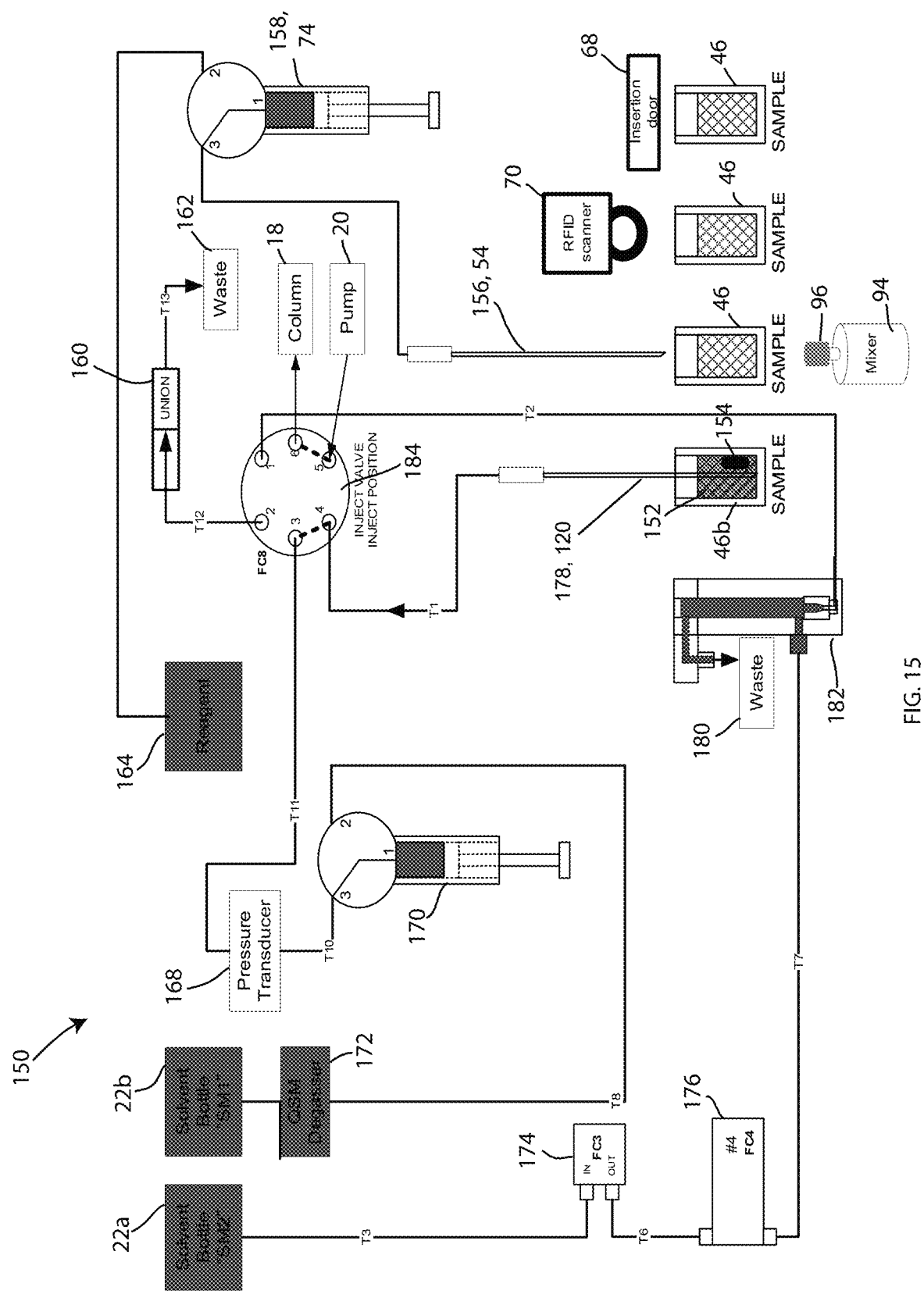
FIG. 15 depicts a schematic view of a draw sample step of the fluidic system of FIGS. 9-14, in accordance with one embodiment.
Figure 16:
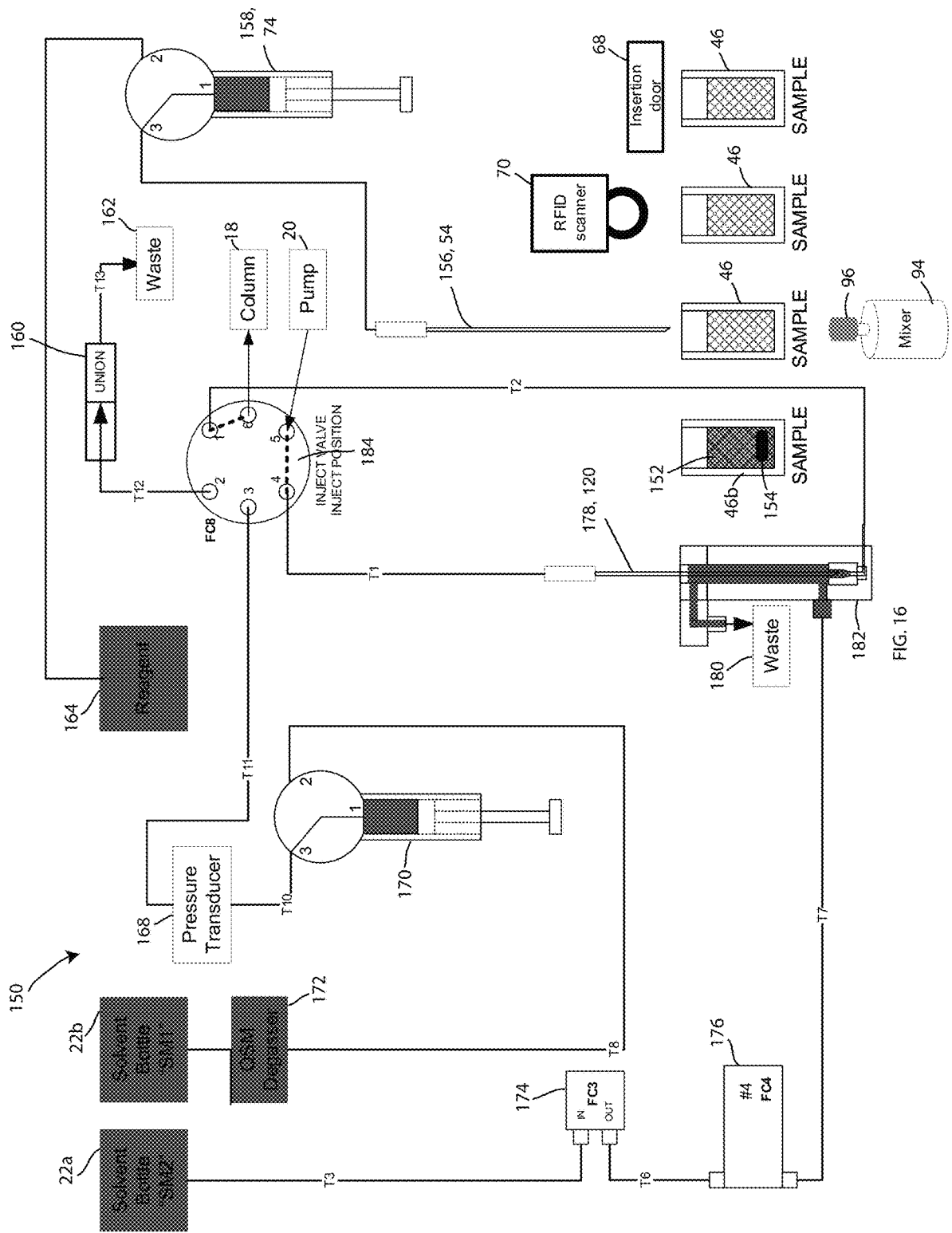
FIG. 16 depicts a schematic view of an inject step of the fluidic system of FIGS. 9-15, in accordance with one embodiment.

FIG. 15 depicts a schematic view of a draw sample step of the fluidic system 150 of FIGS. 9-14, in accordance with one embodiment. Here, the sample-vial 46b is moved into the sample chamber 44 and into the injection station 112 (not shown in FIG. 8). Here, the needle 178 of the chamber needle drive 120 is configured to draw the sample via the pressure transducer 168 and the sample metering syringe 170. FIG. 16 depicts a schematic view of an inject step of the fluidic system 150 of FIGS. 9-15, in accordance with one embodiment. This step may occur immediately following the draw step shown in FIG. 15. At the inject step, the needle 178 of the chamber needle drive 120 may move into fluidic communication with the injection port 182 and inject the sample. The injection port 182 is fluidically connected to the inject valve 184 which is in a valve position that provides the sample to the chromatography column 18.

The sample automation system 15 and/or the sample manager 14 and/or the liquid chromatography system 10 may include a control system, data system, computer system, or data storage and communication interface, such as the data system 34. Whatever the embodiment of the control system it is contemplated to be configured to control the various operations of the sample manager 14 and/or the sample automation system 15 described herein above. For example, the control system may be configured to control the adding of a specified volume of a liquid, such as a reagent, to a vial. The control system may be configured to control bringing a vial over a mixer and activate the mixer for a predetermined time period. The control system may be configured to control the transferring of a specified volume of fluid, such as a sample, from a first vial and dispensing the specified volume into a second vial. The control system may further be configured for controlling heating a vial for a predetermined period, and scanning a vial with an RFID scanner, or barcode scanner, configured to identify the vial to the control system for the purposes of tracking the manipulation of samples. The control system may be configured to control the various components as described, as well as track and store data and/or results related to the various functions.

While the invention has been shown and described with reference to specific embodiments, it should be understood by those skilled in the art that various changes in form and detail may be made therein without departing from the spirit and scope of the invention as recited in the accompanying claims.

What is claimed is:

1. A sample automation system attachable to a sample manager of a liquid chromatography system, the sample automation system comprising:
   a needle drive including a sample needle configured to add a volume of reagent to a sample-vial, the sample needle not configurable to be in fluidic communication with a liquid chromatography column when the sample automation system is attached to the sample manager; and
   a frame attachable to a side housing of the sample manager, the frame including an outer frame configured to hold a portion of a sample-vial carrier system of the sample manager.

2. The sample automation system of claim 1, further comprising a syringe in communication with the sample needle configured to meter drawn samples and the volume of reagent.

3. The sample automation system of claim 1, further comprising an RFID scanner configured to identify sample-vials being managed by the sample manager.

4. The sample automation system of claim 1, further comprising a mixer configured to automatically mix a sample within the sample-vial, wherein the mixer includes a magnetic structure configured to impart movement of a magnet within the sample-vial in order to mix the sample by creating a vortex inside the sample-vial through mechanical contact and rotation.

5. The sample automation system of claim 1, further comprising a heater system configured to apply heat to the sample-vial.

6. The sample automation system of claim 1, wherein the needle drive is further configured to draw a sample from a second sample-vial and dispense the sample into the sample-vial.

7. The sample automation system of claim 1, further comprising a sample-vial belt system including a belt drive having a first pulley, a second pulley and a belt, the belt having an outer surface configured to receive a plurality of sample-vials movable with the belt, the belt configured to move the plurality of sample-vials into a first position for a column sample needle to be inserted into one of the plurality of sample-vials, and a second position for the sample needle to be inserted into one of the plurality of sample-vials.

8. The sample automation system of claim 1, further comprising a control system configured to control at least one of the following operations of the sample manager:
   adding a specified volume of liquid to the sample-vial;
   bringing the sample-vial over a mixer and activating a mixer for a predetermined time period;
   transferring a specified volume from a second sample-vial and dispensing the specified volume into the sample-vial;
   heating the sample-vial for a predetermined period; and
   scanning the sample-vial with an RFID scanner configured to identify the vial to the control system.

9. The sample automation system of claim 1, wherein the outer frame includes an insertion door configured to load and unload sample vials into the sample-vial carrier system of the sample manager.

10. A liquid chromatography sample manager system including:
  a sample manager including:
    a sample delivery system configured to inject a sample from a sample-vial into a chromatographic flow stream, wherein the sample delivery system further includes:
      a first needle drive including a first sample needle configured to extract the sample from the sample-vial and deliver the sample to the liquid chromatography column; and
      a first syringe in communication with the first sample needle configured to meter extraction of the sample from the sample-vial; and
    a sample automation system attachable to the sample manager, the sample automation system including:
      a second needle drive having a second sample needle configured to add a volume of reagent to the sample-vial, the second sample needle not configurable to be in fluidic communication with a liquid chromatography column when the sample automation system is attached to the sample manager.

11. The liquid chromatography sample manager system of claim 10, wherein the first needle drive is located in an internal chamber of the sample manager, and wherein the second needle drive is not located within the internal chamber of the sample manager.

12. The liquid chromatography sample manager system of claim 10, the sample automation system further including a frame attachable to a side housing of the sample manager, the frame including an outer frame configured to hold a portion of a sample-vial carrier system of the sample manager.

13. The liquid chromatography sample manager system of claim 12, wherein the outer frame includes an insertion door configured to load and unload sample vials into the sample-vial carrier system of the sample manager.

14. The liquid chromatography sample manager system of claim 10, further comprising a control system configured to control at least one of the following operations of the sample manager:
  adding a specified volume of liquid to the sample-vial;
  bringing the sample-vial over a mixer and activating a mixer for a predetermined time period;
  transferring a specified volume from a second sample-vial and dispensing the specified volume into the sample-vial;
  heating the sample-vial for a predetermined period; and
  scanning the sample-vial with an RFID scanner configured to identify the vial to the control system.

15. A sample automation system attachable to a sample manager of a liquid chromatography system, the sample automation system comprising:
  a needle drive including a sample needle configured to add a volume of reagent to a sample-vial, the sample needle not configurable to be in fluidic communication with a liquid chromatography column when the sample automation system is attached to the sample manager; and
  an RFID scanner configured to identify sample-vials being managed by the sample manager.

16. A sample automation system attachable to a sample manager of a liquid chromatography system, the sample automation system comprising:
  a needle drive including a sample needle configured to add a volume of reagent to a sample-vial, the sample needle not configurable to be in fluidic communication with a liquid chromatography column when the sample automation system is attached to the sample manager; and
  a mixer configured to automatically mix a sample within the sample-vial, wherein the mixer includes a magnetic structure configured to impart movement of a magnet within the sample-vial in order to mix the sample by creating a vortex inside the sample-vial through mechanical contact and rotation.

17. A sample automation system attachable to a sample manager of a liquid chromatography system, the sample automation system comprising:
  a needle drive including a sample needle configured to add a volume of reagent to a sample-vial, the sample needle not configurable to be in fluidic communication with a liquid chromatography column when the sample automation system is attached to the sample manager; and
  a sample-vial belt system including a belt drive having a first pulley, a second pulley and a belt, the belt having an outer surface configured to receive a plurality of sample-vials movable with the belt, the belt configured to move the plurality of sample-vials into a first position for a column sample needle to be inserted into one of the plurality of sample-vials, and a second position for the sample needle to be inserted into one of the plurality of sample-vials.

18. The sample automation system of claim 17, further comprising a syringe in communication with the sample needle configured to meter drawn samples and the volume of reagent.

19. The sample automation system of claim 17, further comprising an RFID scanner configured to identify sample-vials being managed by the sample manager.

20. The sample automation system of claim 17, further comprising a mixer configured to automatically mix a sample within the sample-vial, wherein the mixer includes a magnetic structure configured to impart movement of a magnet within the sample-vial in order to mix the sample by creating a vortex inside the sample-vial through mechanical contact and rotation.

* * * * *